United States Patent [19]

Haskew

[11] 4,041,841

[45] Aug. 16, 1977

[54] METHODS OF AND APPARATUS FOR CONTROLLING HYDRAULIC EQUIPMENT

[75] Inventor: Francis Anthony Haskew, Burton-on-Trent, England

[73] Assignee: Coal Industry (Patents) Ltd., London, England

[21] Appl. No.: 657,878

[22] Filed: Feb. 13, 1976

[30] Foreign Application Priority Data

Feb. 14, 1975 United Kingdom ............... 06338/75

[51] Int. Cl.[2] ........................ G05D 16/00; F15B 11/08

[52] U.S. Cl. .......................................... 91/421; 91/471

[58] Field of Search .......................... 91/421, 451, 471; 137/87, 115; 173/12

[56] References Cited

U.S. PATENT DOCUMENTS

| | | | |
|---|---|---|---|
| 3,656,560 | 4/1972 | Catterfeld | 91/421 X |
| 3,908,688 | 9/1975 | Gandrud | 91/421 |
| 3,951,162 | 4/1976 | Wilke | 91/421 |

*Primary Examiner*—Robert G. Nilson

*Attorney, Agent, or Firm*—James C. Wray

[57] ABSTRACT

A control for hydraulic equipment including a pressure fluid feed and a pressure fluid return, includes a spool valve arranged to sense the pressure of the pressure fluid in the return and to connect pressure fluid in the feed to exhaust should the sensed pressure fall below a preselected level.

11 Claims, 2 Drawing Figures

METHODS OF AND APPARATUS FOR CONTROLLING HYDRAULIC EQUIPMENT

This invention relates to methods of and apparatus for, controlling hydraulic equipment.

In particular, although not exclusively, the invention relates to the control of hydraulic equipment which is fed with pressure fluid from an electrically actuated pump.

One prior known control for such equipment includes a relatively bulky mechanical/electrical interlock system to ensure that once the electric supply is interrupted the hydraulic equipment will not restart even though the hydraulic control may still have remained in the "operative" position. The inclusion of such an electrical interlock has several disadvantages particularly in an underground coal mine where the equipment must be flameproof and available space is restricted.

An object of the present invention is to provide relatively simple, less bulky and more convenient control equipment.

According to one aspect of the present invention a method for controlling hydraulic equipment including a pressure fluid feed and a pressure fluid return, comprises sensing the pressure fluid in the return to control exhausting of the pressure fluid in the feed such that a sensed preselected fall in the return pressure exhausts the pressure fluid in the feed.

According to another aspect of the present invention, apparatus for carrying out the above defined method comprises a spool valve having a resiliently biassed spool, and pilot means sensitive to the pressure fluid in the pressure fluid return to retain the spool against its resilient bias, the spool moving under its resilient bias to hydraulically connect the pressure fluid in the feed to exhaust.

Figure 1:
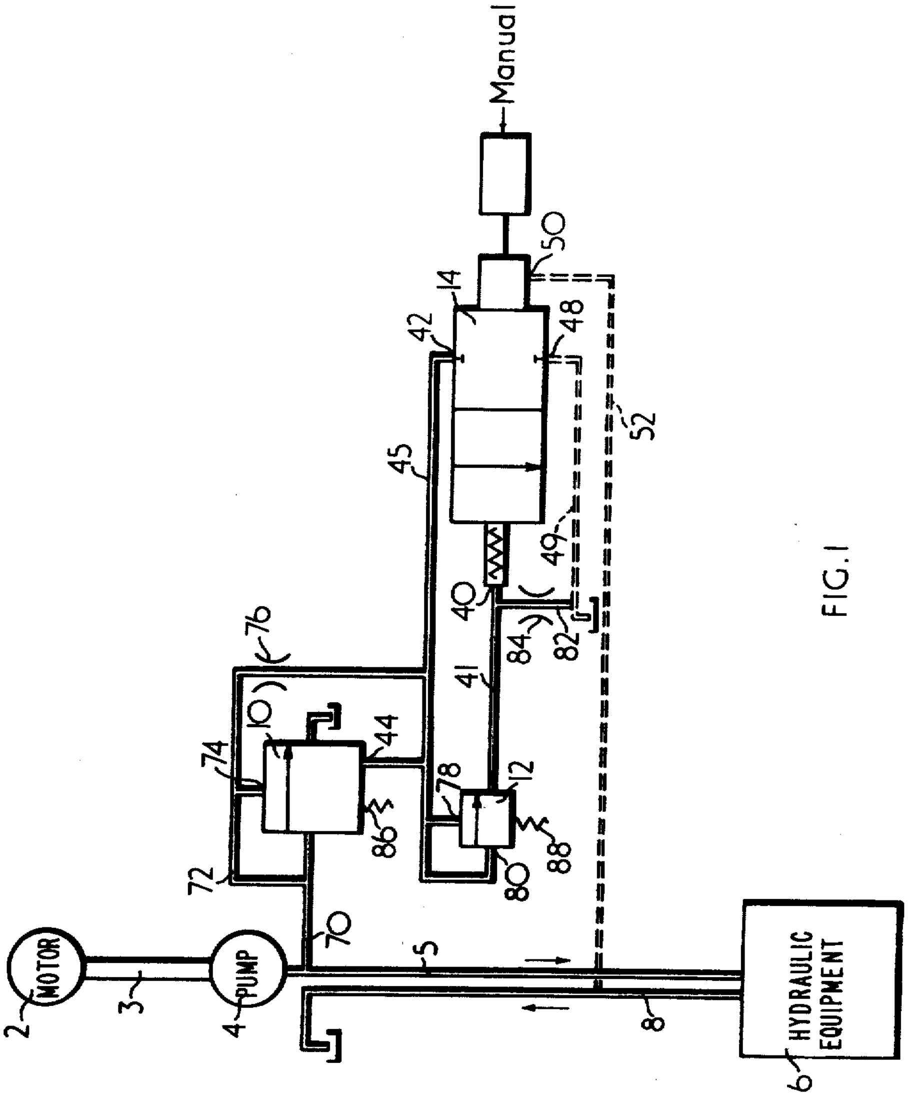
Figure 2:
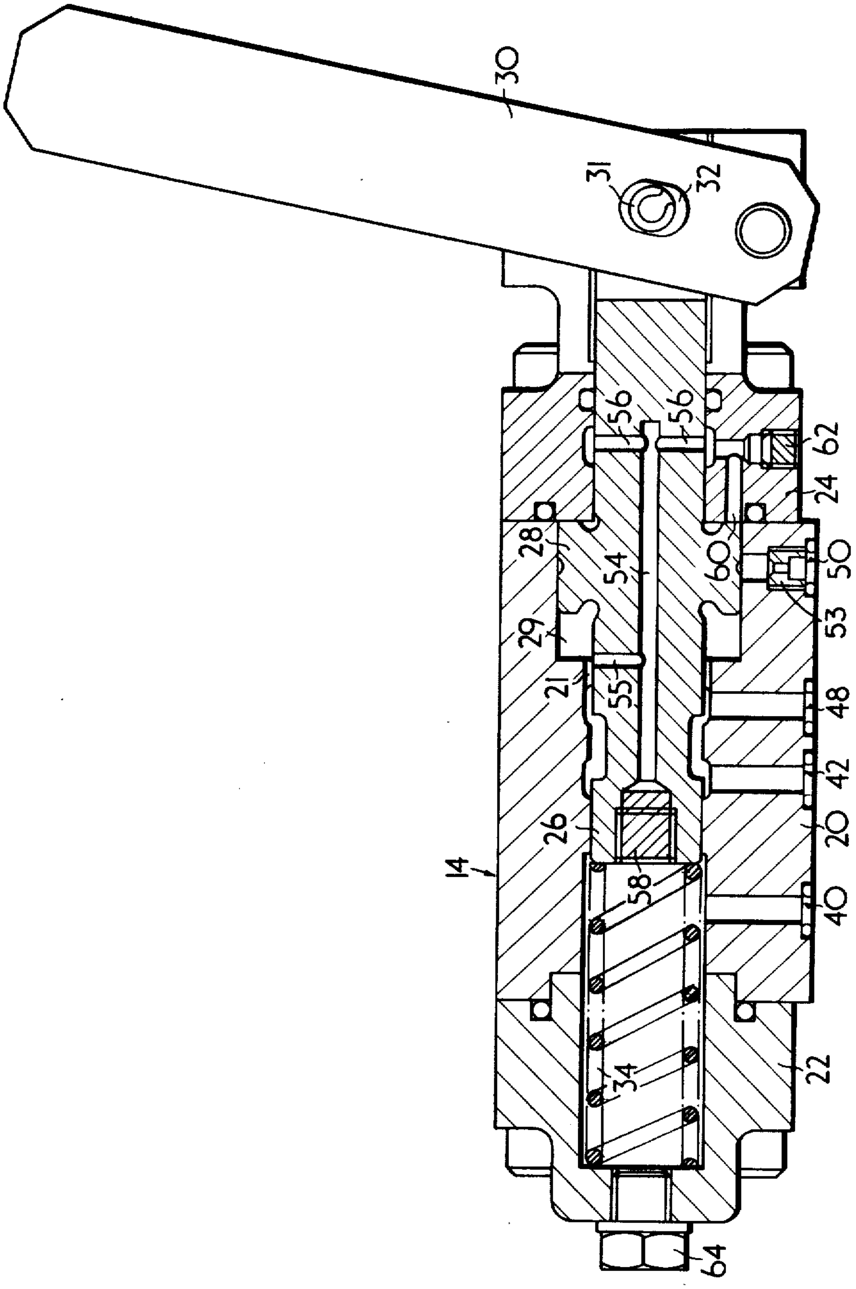

By way of example only, one embodiment of the present invention will be described with reference to the accompanying drawings in which:

FIG. 1 is a circuit diagram for an electrical hydraulic drive including a control according to the present invention; and FIG. 2 is a longitudinal section through a component included in the circuit diagram.

Referring to FIG. 1, the hydraulic drive includes an electric motor 2 drivably connected via shaft 3 to a pump 4 arranged to feed pressure fluid along line 5 to hydraulically actuated equipment 6, for example, a hydraulic motor of a mineral mining machine or piston and cylinder arrangements of mineral mining equipment.

Fluid is exhausted from the hydraulically actuated equipment back to tank along a pressure fluid return line 8 which is maintained at a preselected minimum pressure, for example 25 pounds per square inch. Typically, in mineral mining equipment the resistance to fluid flow in the return line 8 is sufficient to ensure that a desired minimum pressure is obtained without any restriction being provided in the line. However, if the fluid pressure in the return line may tend to fall below the preselected level, then a restrictor, for example, a spring loaded check valve (not shown) may be provided in the return line.

The control for the hydraulic drive includes three spring loaded valves 10, 12 and 14. The construction of valve 14 is shown in more detail in FIG. 2.

The valve 14 comprises a housing assembly including an outer sleeve member 20 having a stepped bore 21 and two end members 22, 24. A spool 26 sealably slidable along the bore 21 has a piston component 28 sealably slidable along a relatively large diameter chamber 29 formed by the stepped bore. One end of the spool 26 is attached to a manually operable handle 30 pivotally mounted on the end member 24 and attached to the spool via a pin 31 on the spool engaging within a slot 32 in the handle. The other end of the spool 26 is acted upon by a coil spring 34 which urges the spool into a position as shown in FIG. 2, i.e. with the spool at the right hand end of its travel along the bore 21.

The housing assembly has an intake port 40 connecting the spool valve 14 to the valve 12 via line 41, a vent port 42 connecting the spool valve 14 to a port 44 of the valve 10 via line 45, a drain port 48 connected to a drain line 49, and a pilot port 50 connected to the return line 8 via line 52. The port 50 is provided with a restrictor 53 to prevent excessive pressure fluid being leaked to drain.

Drain passages 54, 55 and 56 are formed in the spool 26, a plug 58 blocking one end of the longitudinal passage 54. With the valve in the operational "open" mode as shown in FIG. 2, the cross passage 56 interconnects with a passage 60 formed in the end member 24, a plug 62 blocking one end of a cross bore constituting a part of the passage. The end of the passage 60 leading to the chamber 29 is closed by the piston 28.

A plug 64 is provided in the end member 22 and various seal rings are provided between components of the valve and also for the connectors (not shown) to the various parts 40, 42, 48 and 50.

The remaining control circuit includes line 70 for feeding pressure fluid from the pressure line 5 to the valve 10 and a branched line 72 from the line 70 to an inlet port 74 of the valve 10 and through a restrictor 76 to the previously mentioned line 45 which in turn branches to a pilot port 78 and to the intake port 80 of the valve 12. A line 82 connects the line 41 to the drain line 49 via a restrictor 84. The two valves 10 and 12 have springs 86 and 88, respectively urging the valves to their closed positions.

In use the electric motor 2 is started and the driven pump 4 delivers pressure fluid into line 5. Initially, the handle 30 of the spool valve 14 is in the open position with ports 42 and 48 hydraulically connected (as indicated in FIG. 2) allowing pressure fluid in lines 72 and 45 to drain via line 49. As there is some flow along line 72 through the restrictor 76 there is a pressure drop across the valve 10 which is sufficient to operate the valve against its spring 86 to exhaust the feed from the pump 4 to tank. Thus the pressure of the fluid in line 5 is prevented from building up to the "working" pressure required to actuate the machinery.

Upon the operator moving the handle 30 to its operating position, the spool 26 is moved along the bore 21 to isolate port 42 from the drain port 48 and close the lines 72 and 45. Consequently, there is no flow through the restrictor 76 and the fluid pressure acting on the opposite sides of the valve 10 is equalised. Thus, the valve 10 is actuated under its spring loading and the line 70 is closed preventing flow to tank and allowing the pressure of fluid in line 5 to build up to the working pressure to actuate the machinery 6. As the operator moves the handle 30 to its operating position the piston 28 opens the pilot port 50 allowing the return pressure (which as previously mentioned is maintained at a preselected minimum pressure) to be fed from return line 8 via line 52 to the chamber formed by the enlarged part of the bore 21 to retain the spool 26 in the operating position against the action of spring 34. Thus, when the operator releases the handle 30 the spool 26 is retained in the operating position. With the spool 26 in the operating position the drain passage 56 is closed.

If during operation the machinery becomes overloaded the delivered working pressure in the line 5 tends to increase above a preselected maximum value the pressure fluid in lines 72, 45 acts via pilot port 78 of valve 12 to unbalance the valve which is actuated against its spring loading to allow pressure fluid to flow along line 41 to the port 40 of valve 14. Consequently, the spool 26 of valve 14 is moved along the bore 21 against the action of the relatively low return pressure acting via port 50 on the piston 28. The ports 42 and 48 of valve 14 now become hydraulically connected allowing pressure fluid to flow to drain from line 45, and through restrictor 76 in line 72. As soon as there is fluid flow in lines 45 and 72 the valve 10 becomes unbalanced due to the pressure drop across the restrictor 76 and moves against its spring loading to exhaust pressure fluid from line 5 to tank. Thus, upon the machinery 6 becoming overloaded the resultant increase in the pressure of fluid in line 5 is sensed and the feed of pressure fluid to the machinery is rapidly exhausted. This reduces the tendency of the machinery becoming damaged due to overloading. Once the valve 10 has been moved by pressure fluid applied to port 40 the machinery 6 will not restart until the handle 30 has been manually reset in the operating position.

Upon the operator moving the handle 30 into the operating position the pressure fluid discharged by the movement of the spool 26 is exhausted via line 82 and restrictor 84 to drain.

If during operation, the electrical supply to the electric motor 2 is cut off due to, for example, operation of the manual control switch for the motor or alternatively to an electrical fault, the motor immediately starts to slow down prior to stopping and the return pressure in return line 8 will fall rapidly irrespective of the operational position of the machinery 6. This highlights the main advantage of the present invention as depending upon the operational mode of the machinery 6 it does not follow that because the electric motor slows down the pressure of the fluid in the feed line 5 will fall rapidly. This is because until the motor slows down sufficiently it drives the pump such that enough pressure fluid is fed into the line 5 to overcome leakage losses. Consequently it would be some time before a sufficient drop in the decaying delivery of pressure fluid into line 5 from a reducing speed pump 4 would be detected. Consequently, if the hydraulic control means was operationally sensitive to the feed pressure in line 5 there would be a likelihood that the control may be slow to sense the reduced motor speed and the response of the control to exhaust the pressure fluid in line 5 would be slow. Thus, if the electric motor 2 was restarted quickly within a relative short period of time the hydraulic control may not function to prevent the machinery 6 recommencing operation i.e. the spool 26 of valve 14 remains in the operating position.

However, as soon as the electric motor 2 starts to slow down, the return pressure in line 8 falls. The control as defined by the present invention is arranged to sense the reduced return pressure. When a preselected fall in the return pressure is sensed by the piston 28 via port 50 and line 52, the spool 26 is moved by the action of the spring 34 to hydraulically connect the ports 42 and 48 to allow the feed pressure fluid from the pump 4 to be discharged to drain. Upon the electric motor restarting the spool remains in the "closed" position and the machinery 6 remains inoperative until the operator actuates the handle 30.

If during normal operation the operator wishes to stop the machinery 6, he can manually move the handle 30 together with the spool 26 to the open position against the relatively low return pressure acting on the piston 28.

From the above description it can be seen that the present invention provides a relatively simple hydraulic control which is rapid to respond to a fall in the speed of the electric motor to prevent operation of the machinery 6 until the control is manually reset.

I claim:

1. A method of controlling hydraulic equipment including a pressure fluid feed and a pressure fluid return, comprising sensing the pressure fluid in the return to control exhausting of the pressure fluid in the feed such that a sensed preselected fall in the return pressure exhausts the pressure fluid in the feed.

2. Apparatus for carrying out the method defined in claim 1, comprising a spool valve having a resiliently biassed spool, and pilot means sensitive to the pressure fluid in the pressure fluid return to retain the spool against its resilient bias, the spool moving under its resilient bias to hydraulically connect the pressure fluid in the feed to exhaust.

3. Apparatus as claimed in claim 2, comprising manual control means for the spool valve, the manual control means having to be re-set once the pressure fluid in the feed is connected to exhaust.

4. Apparatus as claimed in claim 2, comprising a spring loaded valve sensitive to the pressure of the pressure fluid in the feed to actuate the spool valve should the sensed pressure in the feed exceed a preselected value to connect the pressure fluid in the feed to exhaust and prevent overloading of the hydraulic equipment.

5. The method of claim 1 wherein the sensing comprises holding a valve in a first direction against spring force with fluid pressure in the return, and moving the valve in a second direction with spring force when fluid pressure in the return drops below a predetermined amount.

6. The method of claim 5 further comprising blocking a path of pressure fluid in the return to the valve, when the valve is moved in the second direction.

7. The method of claim 6 comprising manually moving the valve in the first direction against spring force and thereby opening the fluid pressure in the return to the valve, to hold the valve in the first direction while fluid pressure in the return exceeds a predetermined amount.

8. The method of claim 5 further comprising exhausting fluid from a first high pressure control line when the valve is in the second direction, admitting high pressure from the feed to one side of a first balancing valve, and communicating pressure from the first control line to another side of the first balancing valve, and moving the first balancing valve from a normally closed position against spring force to a normally opened position when a pressure differential exists between pressure in the fluid feed and pressure in the first control line, and exhausting the fluid feed through the first balance valve when the valve is open.

9. The method of claim 5 further comprising admitting pressure from the feed to a first side of the second balanced valve, moving the second balanced valve from the normally closed position against spring force to a normally open position, when pressure in the feed exceeds a predetermined amount, admitting pressure from the feed through the second balanced valve, and augmenting spring force and opposing pressure fluid in the return in the first valve to move the first valve in the second direction when pressure in the feed exceeds a predetermined amount.

10. The method of claim 1 wherein the sensing comprises holding a valve in a first position with pressure fluid from the return and shutting off pressure from the return upon the pressure falling below a predetermined value.

11. The method of claim 1 further comprising discontinuing sensing upon the preselected fall in the return pressure.

* * * * *